United States Patent [19]
Hadjidjanian

[11] 3,835,705
[45] Sept. 17, 1974

[54] FLOWMETER

[75] Inventor: Huguette Micheline Mary Nadot Hadjidjanian, Pavil Lon-Sous-Bois, France

[73] Assignee: Societe Civile Le Brin, S/Marne, France

[22] Filed: May 12, 1972

[21] Appl. No.: 252,565

[30] Foreign Application Priority Data
May 19, 1971 France ............................. 71.18280

[52] U.S. Cl. .............................................. 73/194 F
[51] Int. Cl. ..................................... G01f 1/00
[58] Field of Search ............... 73/194 F, 194 E, 181; 324/33

[56] References Cited
UNITED STATES PATENTS
3,470,741 10/1969 Durbin .............................. 73/194 F
3,648,517 3/1972 Dorman ............................ 73/194 F FOREIGN PATENTS OR APPLICATIONS
826,195 12/1959 Great Britain ....................... 324/33

Primary Examiner—Charles A. Ruehl
Attorney, Agent, or Firm—Brisebois & Kruger

[57] ABSTRACT

Gauge for measuring the mass flow of a gas comprising means for producing a corona discharge of ions in response to high voltage pulses, at least two collecting electrodes for receiving said ions, means for measuring the difference in the number of ions reaching two of said electrodes, and electronic means for interrupting said measurement at variable intervals so that the length of time during which the measurement is carried out is less than the length of time between two successive high voltage pulses.

11 Claims, 9 Drawing Figures

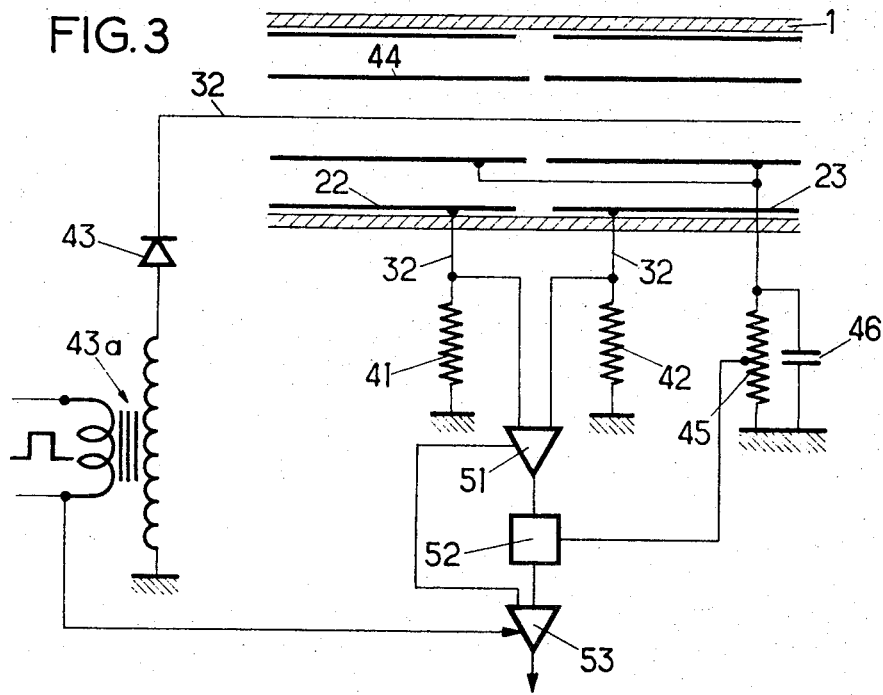
FIG. 3
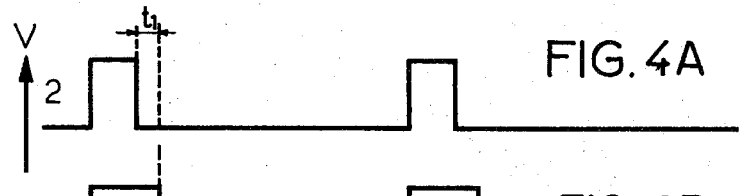
FIG. 4A
FIG. 4B
FIG. 4C
FIG. 4D
FIG. 4E
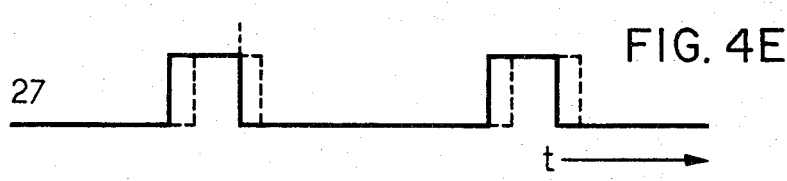

FLOWMETER

SUMMARY OF THE INVENTION

This invention relates to a method and gauge for measuring the mass flow of a stream of gas and consequently also measuring the velocity of flow of said stream. Such measuring gauges are commonly known as flow meters or anemometers depending upon the application for which they are used.

More specifically, the invention relates to devices of the type in which a direct measurement of the mass flow or of the velocity of a gas is obtained by taking into account modifications in the time of travel and the trajectory of a beam of ions, which beam is intermittently created inside the apparatus containing the gas, which may be stationary or flowing.

It is known that, in order to measure the mass flow or velocity of a gas, it is conventional to use the modification of the trajectory of a beam of ions positioned perpendicularly to the direction of flow of the gas. A deviation of the beam is produced in such a manner that it can be measured and is proportional to the mass flow or the velocity of the gas. A known technique in the prior art (Pauthenier-Nygaard-Obermaier) consists in ionizing the gas itself in order to obtain the beam of ions, utilizing either a radioactive source or a conductive body brought to an electrical potential sufficiently high to ionize the gas in accordance with a physical process known as a Townsend discharge.

Unfortunately it is obvious that a geometric measurement of the deviation of the beam of ions under the influence of the flow of a stream of gas does not provide a direct measurement of the mass flow or the velocity of the gas because the physical characteristics of the beam of ions created in a continuous fashion, and in particular the average speed of the ions making up the beam as well as the spatial location in which the ions are created, depend both on the geometry of the apparatus of the prior art and on the nature of the gas itself.

In order to overcome this fundamental difficulty, the present invention relates to an ionization gauge in which the measurements of the mass flow or the velocity of a gas are independent, on the one hand, of the geometry of the gauge, and, on the other hand, especially of the nature of the electrical charges created in the gas and impurities which may be contained within this gas.

A first characteristic of the invention consists in geometrically collecting the ions of the beam used for measuring purposes in such a manner that, for a given electrical potential of the ionizing source, and for a constant number of ions created, they are distributed between two collecting electrodes so that the difference between the number of ions arriving per second simultaneously at one and at the other electrode varies linearly as a function of the mass flow of the gas, or, for a constant specific mass of said gas, as a function of its velocity of flow. In accordance with the present invention the means utilized make it possible to employ an elongated source of ions, that is, an ionizing region the dimension of which in the direction of flow is not critical. By way of example, there will be described below a device utilizing as an ionization source a thin wire stretched along the axis of a cylinder traversed by the gas the velocity or mass flow of which is to be measured, the length of this wire not being critical. In this embodiment of the invention there is no localization of the stream of ions in a small region but, on the contrary, its volume may be as large as desired in order to permit an average measure of the mass flow or velocity within said volume. This characteristic has, in particular, the object of providing greater constancy in the time during which the ions are produced, which is, in the case of a small source, much more subject to perturbations and, therefore, characterized by a random fluctuation in the number of ions created per unit as it operates.

The collecting electrodes used in the measuring gauge according to the invention may consist of a resistive conductive wire helically coiled about the thin wire constituting the ion source.

These collecting electrodes may also consist of two conductive cylinders the axis of which coincides with that of the wire constituting the ion source. These two cylinders are spaced from each other by a short distance, preferably less than the length of the thin wire constituting the source.

In a preferred embodiment of the gauge according to the invention the collecting electrodes consist of two cylinders coaxial with the wire constituting the ion source, the adjacent edges of said cylinders terminating in substantially triangular teeth, with the teeth in one cylinder opposite the spaces between the teeth in the other cylinder.

As a consequence of this arrangement, the variation in the surface of collection is substantially a linear function of the deformation of the trajectory of the ions. This permits a linear measurement of the quantities of ions collected.

A second characteristic of the invention is intended to render the measurement independent of the nature of the gas and consists in electrically collecting the ions received by each electrode in a manner such that, when making the measurements, it is possible to take into account the time which they have taken to travel over the path between the elongated source and the collecting electrodes.

For a given electrical potential of the ionizing source, and for a constant number of ions created per second, this time of travel depends, in effect, strictly upon the speed of propagation of the ions, and consequently, on the nature of the gas. The geometrical deviation of the beam is, for a given mass flow, or a constant specific mass, for a given velocity, proportional to this time of travel. The electrical process of collecting the ions in order to obtain the final measurement, consists in multiplying at each instant the measurement of the geometric deviation by a factor which varies inversely with the time of travel.

For this purpose the invention is characterized by the fact that the ions are not continuously created but are created only during periods of time and, beginning at known moments at which they commence to be emitted by the source, they are collected in a manner such that the currents which they create in the collecting electrodes are electrically multiplied by a factor varying inversely with the period of time elapsing between the beginning of the emission and the time at which they are collected. This characteristic, associated with the first, serves to yield a corrected value of the deviation independent, in particular, of the nature of the gas, and in the case of a given gas, of impurities which it may contain.

In another embodiment of the measuring gauge according to the invention, the small conductive wire is stretched along the axis of flow over the entire length of the gauge. It is encircled by a third electrode forming an electrostatic screen and constituted by two conductive cylinders which are slightly spaced and brought to the same potential through a resistance and a capacitance connected in a parallel to ground. These two cylinders are positioned inside the collecting electrode and concentric therewith.

As a consequence of this arrangement, the potential of this third electrode varies as a function of the ionizing current so as to modify the value of the electrostatic field between this third electrode and the collecting electrodes. In this way a measurement is obtained which is more independent of the fluctuations in the density of the gas or the ionization voltage.

In another embodiment of the gauge according to the invention the conductive wire constituting the ion source is stretched along the axis of gaseous flow between two cylindrical conductive mandrels and ends of which are in contact with said wire and advantageously have a profile such that the electrical field is modified in the region of the ion source so that the equi-potential surfaces of the field in this region approach as closely as possible a cylinder of revolution.

In this manner it is possible to correct the linearity.

The invention will be better understood from a study of the embodiment hereinafter described which is given purely by way of example and illustrated by the figures in the accompanying drawings in which:

FIG. 3 shows another embodiment similar to that of FIG. 2, but using a third electrode connected to a common point;

FIGS. 4A – 4E show the different wave forms in the circuit of FIG. 5; and

Figure 1:
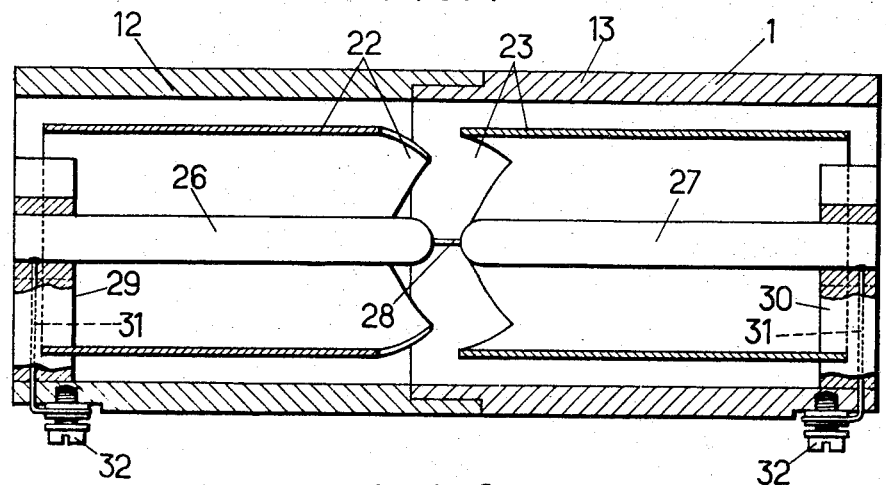
FIG. 1 shows the general arrangement of a gauge having the characteristics previously described.

Turning now to FIG. 1, this shows a cylinder 1 made of an insulating material and divided into two halves 12 and 13 which interfit. In this cylinder are seated, in contact with the inner wall of the cylinder, two collecting electrodes 22 and 23, having four helically contoured teeth. Along the axis of the cylinder 1 are two conductive rods 26 and 27 which are cylindrical and of the same diameter. These two rods are connected to each other by a very fine wire stretched therebetween. The length of this wire is just less than the height of one of the teeth along the edges of the electrodes 22 and 23. It is this very fine wire which constitutes the ion source. The rods 26 and 27 are held by radial insulating arms 29 and 30 positioned at the ends of the cylinder 1. Two of these arms are hollow to permit a conductive rod 31 to pass therethrough. This rod conducts the high voltage to the ion source and is supplied by the terminals 32.

The currents discharged from the cylindrical electrodes are picked up at terminals which are not shown.

Figure 2:
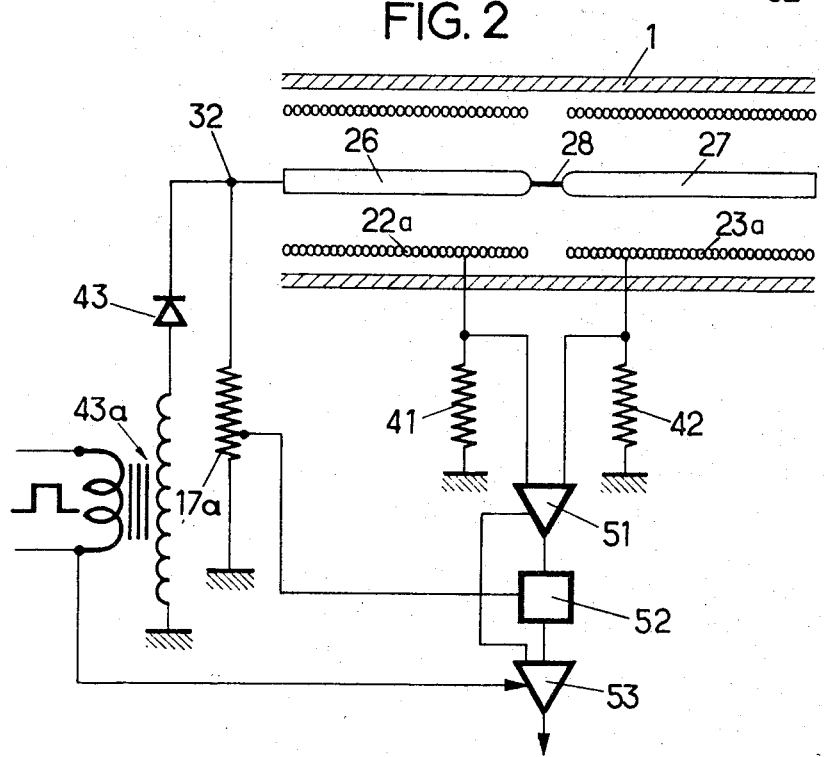
FIG. 2 illustrates the electrical supply to the gauge and the electrical means used to collect the ions in a manner such that the measurement of the deviation is independent of the mobility of these ions.

FIG. 2 shows the electrical system supplying the gauge and the electrical means utilized to collect the ions in such a manner that the measurement of the deviation is independent of the mobility of these ions, and shows the substitution of wire coils for the solid collecting electrodes of FIG. 1.

The conductive wire 28 is brought intermittently to an elevated potential U by means of an induction coil 43a, for example. In the primary of this coil a square wave current is induced. When this current ceases, at the instant $t = 0$, a variable inductive electromotive force U appears, which is maintained for a very short time, but one which is much longer than the time required for the ions to pass from the anode to the cathode.

During the duration of this pulse and so long as the potential U is greater than the ionization potential $U_0$ due to the corona effect, ions are produced in the immediate vicinity of the wire in a conventional manner. These ions are attracted by the electrical field due to the difference in potential between 26, 27, 28 and the electrodes 22a and 23a connected to the ground having zero potential through low value resistances 41 and 42. A diode 43 is positioned between the end of the induction coil and the cylinders, 26, 27, 28, in order to permit the latter conductor to remain at a certain potential between two successive pulses of the coil. It appears, in effect, that under a variable voltage U, the ionization of the air discharges the system 26, 27, 28 the potential of which decreases to the value $U_0$, at which the ionization effect by corona discharge is null. The diode thus permits the system 26, 27, 28 to retain between successive high voltage pulses a potential between the maximum value U and the value $U_0$.

FIG. 3 represents another embodiment illustrating the use of a third electrode 44 connected to a common point, the ground of the circuit, through a resistance 45 and a capacitance 46 so as to produce automatic polarization and permit the electrode 44 to retain a potential intermediate between U and $U_0$. This electrode thus serves the purpose of an electrostatic screen.

So long as U is greater than $U_0$ the cloud of ions created has a symmetry of revolution about the wire 28. The movement of an individual ion under the effect of the electron field prevailing between the wire 28 and the collecting electrodes 22 and 23 is influenced along the line of the wire 28 by the movement of the gas inside the collecting electrodes 22 and 23. It is well known that the resulting speed of this ion is the sum of a. a radial speed having the form:

$$V = K[E(U)/p]$$

(1)

in which $K$ is the mobility of the ion,
$E$ is the radial electric field due to the potential U,
$p$ is the specific mass of the gas circulating inside the electrodes 22 and 23, and
b. the longitudinal speed $V_g$ at which the gas flows.

It will thus be seen that the displacement of an individual ion along the axis of the cylinder is proportional to $V_g$ and inversely proportional to V.

If we now consider the cloud of ions created by the wire 28, centered with respect to the collecting electrodes 22 and 23, and in the absence of speed $V_g$, the same number of ions will arrive at the collecting electrodes 22 and 23. In the presence of a speed $V_g$, on the contrary, there will be a dissymmetry between the number received by the two electrodes 22 and 23. If N is the total number of ions created, tthe difference $\Delta N$ between the number of ions received by the two electrodes 22 and 23 will be such that $$\frac{\Delta N}{N} = \frac{V_g}{\frac{KE}{p}}$$

with the exception of a constant (2).

If $N_1$ and $N_2$ are the numbers of ions arriving per unit in time at the electrodes 22 and 23 they produce proportional currents $I_1$ and $I_2$ in the resistances 41 and 42. It will thus be seen that, during steady operation, the following proportional relationship is obtained:

$KE (I_1 - I_2/I_1 + I_2) = pV_g$ with the exception of a constant (3).

This permits the measurement of the flow of gas passing inside the gauge for ions having the same mobility. It would appear, however, that as a practical matter, the gas the flow of which is to be measured would be subject to variations in composition so that impurities might exist, at least as traces (smoke, water vapor). Under these conditions, the mobility of the ions in response to the electric field might vary in any manner, which would have the consequence that:

1. a gauge operating continuously would not provide an absolute measurement of the flow since this measurement depends on the mobility K of the ions, and thus on the nature of the gas.

2. For a given gas the measurement of the flow might be completely falsified by the presence of impurities in the gas. One of the novel characteristics of the invention is that, as has already been pointed out, an electrical device for collecting the ions has been described such that the measurement will be specifically independent of the mobility, which permits the measurement of flow independently of perturbations and of the nature of the gas to be measured, so long as the ionization results from corona discharge.

According to the laws governing the movement of ions having the mobility K in the presence of an electrical field, it appears that, for a given potential U, a specific given mass P and a specific speed $V_g$, the ratio $\Delta N/N$ is proportional to the inverse $1/K$ of the mobility. For a given mobility K and a fixed potential U, this same ratio $\Delta N/N$ is proportional to the mass flow $pVg$. Under these conditions, from the moment at which ions are created in response to the high voltage U, they reach the electrodes 22 and 23 in a time t which, for a constant U, depends among other things, on their mobility K, so that the time t will vary as $1/K$. It follows that, regardless of whether ions of different mobilities are created, or whether their mobility varies during the travel from anode to cathode, which would result in an average mobility K, the value of the ratio $\Delta N/N$ will increase for a given flow of gas proportionally to the time $t$ after the beginning of the high voltage pulse. Now let $\tau$ equal the minimum time necessary for ions to pass from the anode to cathode. The electrical device for collecting the ions is such that, in a first stage, the product $U\Delta I/I$ is produced under conditions hereinafter described. In a second stage this product $U\Delta I/I$ is multiplied by a factor $g(t)$ depending on the time and such that:

$$g(t) = 0 \text{ for } t > \tau$$
$$g(t) = 0 \text{ for } t > \tau'$$

$\tau'$ being the maximum time required for the ions to travel from the anode to the cathode, which corresponds to the minimum mobility $g(t) = A/t$ or A constant for $\tau < t < \tau'$ Under these conditions it will be seen that, for the effective duration of the measurement, the product M which represents the result of the measurement is in accordance with (3):

$$M = g(t) (\Delta I/I) U = g(t) pVg/K$$

(4)

It will thus be seen that M is independent of the mobility $K$ because $g(t) = AK$ except for a constant, which constant may include a term proportional to the inverse of the specific mass p if $V_g$ is to be measured directly.

It should be noted that if the time $\tau$ is short enough, the multiplication by $g(t)$ is not necessary. An electrostatic screen positioned very close to the collecting means may usefully serve to determine the time $\tau$ by application of a low voltage pulse which is slightly negative with respect to the collectors, which pulse has precisely the duration $\tau$.

It is obvious that the system operates in a continuous manner and that at each high voltage pulse a measurement is effected. It thus appears that the electrical collecting means may be applied in a general way to any device utilizing the deviation of a jet of ions to measure speeds or rates of flow.

FIG. 2 shows schematically that the currents appearing at the terminals of the resistances 41 and 42 are introduced into the amplifying assembly 51 to derive $\Delta I = I_1 - I_2$, and $I = I_1 + I_2$. The multiplying and dividing device 52 receives, on the one hand, the output of the amplifiers 51, and, on the other hand, a part of the high voltage across the resistance 17a connected in the high voltage circuit after the diode 43 and, finally, a synchronizer 2a for the function generator which is inversely proportional to time. The multiplier/divider 52 carries out the operation $(U/I) g(t)$. The multiplier amplifier assembly 53 is connected to the output of the devices 51/52 and, on the other hand, to the primary of the induction coil 43a so as to carry out the final operation $\Delta I(U/I) g(t)$ as will be explained in greater detail and thus obtain an electrical signal rigorously proportional to the desired mass flow independent of the mobility of the ions according to Formula (4). FIG. 3 shows that the multiplier device 52 is advantageously connected at an intermediary point of the polarizing resistance 45 of electrode 44. In this manner the measurement is rendered more independent of fluctuations in the density of the gas and in the ionization potential.

Figure 5:
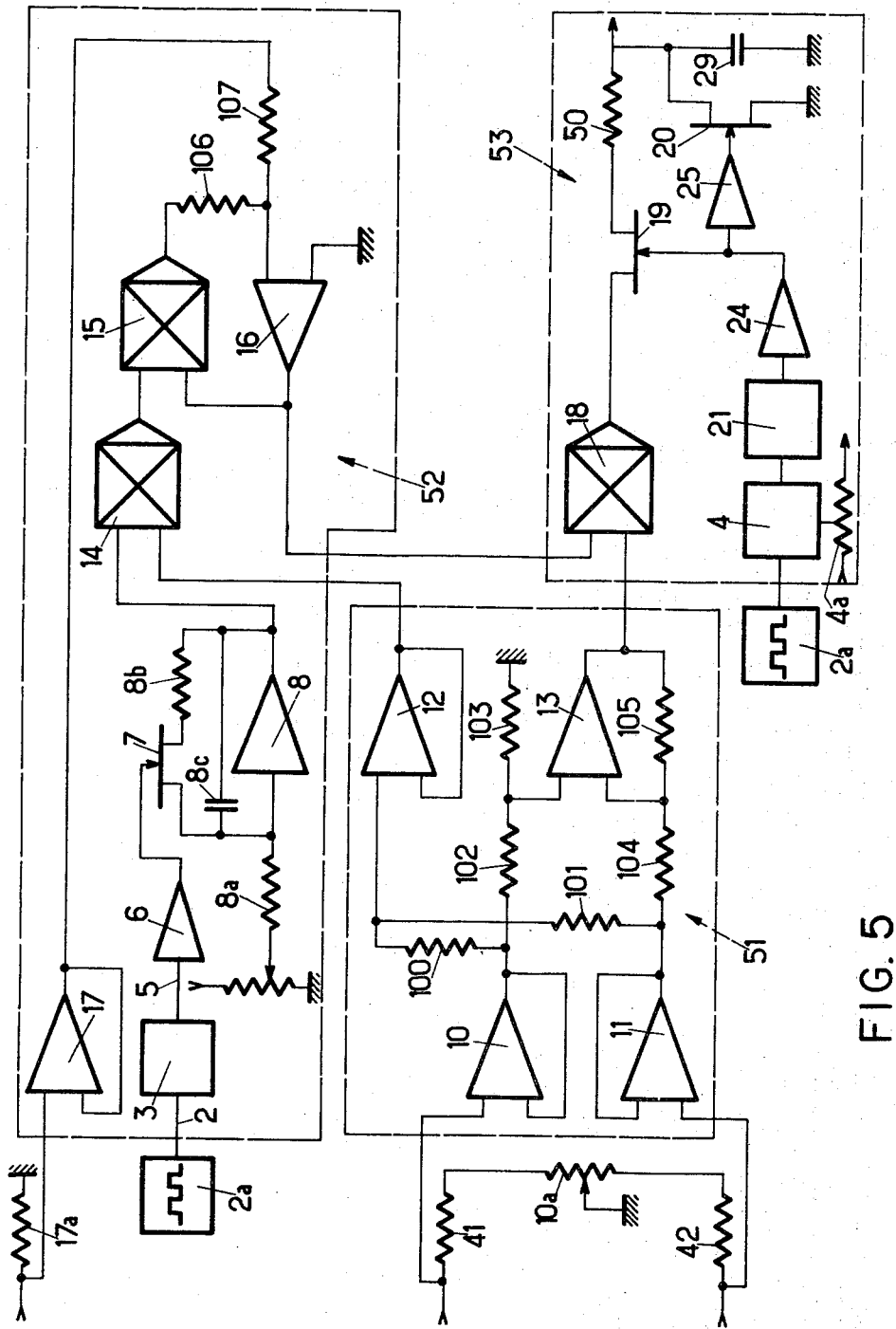
FIG. 5 is an electrical diagram showing the different electronic components used to electrically collect the ions in the devices previously described.

FIG. 5 shows by way of example the different electronic means used to ensure the collection of the ions under the operating conditions hereinbefore described. FIG. 4 shows the shape of the various wave forms obtained in the circuit of FIG. 5. As shown in FIG. 5 the circuit comprises a multivibrator 2a delivering the signal 2 which provides the fundamental frequency for the general operation of the device and the attractiveness of which appears on FIG. 4. Its output signal 2 controls the supply and the delay circuits 3 and 4.

The delay circuit 3 may be a monostable associated with an OR circuit which delays the trailing edge of the signal 2 by a time $t_1$ and delivers the signal 5 shown on FIG. 4. This signal 5 controls the analog gate 7 through the interface circuit 6. When the gate 7 is closed, the operational amplifier 8 is connected to the resistances 8a and 8b to act as a gain amplifier. When the gate 7 is open, the amplifier 8 is connected to the condenser 8c and the resistance 8a to act as an integrator. The shape of the resulting signal 9 is shown on FIG. 4. This signal never starts at zero so as to avoid division by zero, as will be seen hereafter.

The currents $I_1$ and $I_2$ from collecting electrodes 22 and 23 develop proportional voltages at the terminals of resistances 41 and 42. The potentiometer 10a permits exact regulation of the equilibration of the gauge.

The operational amplifiers 10 and 11 provide connections to the subsequent circuits.

The operational amplifier 13 is connected as a subtractor across the network of resistances 102, 103, 104, 105, and the operational amplifier 12 is connected as an adder. The multiplier 14 multiplies the sum $(I_1 + I_2)$ by the sawtooth wave 9. $(I_1 + I_2)$ is delivered by the operational amplifier 12 mounted as an adder, after the summing resistances 100 and 101. The multiplier 15 associated with the operational amplifier 16 provides a divider circuit in association with the resistances 106 and 107. This divider circuit receives the dividend which is a fraction of the supply voltage which appears at the terminals of the resistance 17a and is transmitted by the operational amplifier 17 through the resistance 107. It also receives the divisor from the multiplier 14. The quotient is the correction factor which is multiplied by $(I_1 - I_2)$ in the multiplier 18. $(I_1 - I_2)$ is provided by the amplifier 13.

The analog gates 19 and 20 mounted in a series - parallel cut-off circuit transmit only a fraction of the output signal from 18. This fraction is the one during which 19 is closed and 20 is open. The time during which 19 is closed and 20 open is determined by the monostable 21 which is actuated by the signal 2 through the delay circuit 4. The resulting delay is adjustable by the potentiometer 4a, which permits the location of the measurement in the operating cycle. The output signals of the delay circuit 4 and monostable 21 are shown in FIG. 4 as 26 and 27 respectively.

The interface circuits 24 and 25 transmit and match the interval of measurement to the control for the analog gates 19 and 20.

The final signal is integrated by a circuit which may comprise a resistance 50 and the condenser 29.

The drawings merely show one possible embodiment of the circuit. It will of course be appreciated that, in view of the independence of the order of the factors, many other embodiments of the circuit can readily be devised.

What is claimed is:

1. Gauge for measuring the mass flow of a gas comprising means for producing a corona discharge of ions in response to high voltage pulses, at least two collecting electrodes for receiving said ions, means for measuring the difference in the number of ions reaching two of said electrodes, and electronic means for interrupting said measurement at variable intervals so that the length of time during which the measurement is carried out is less than the length of time between two successive high voltage pulses.

2. Gauge as claimed in claim 1 which comprises a function generator delivering an intermittent signal inversely proportional to time, a multiplier connected to the output of said function generator and to said difference-measuring means to render said measurement independent of the mobility of the ions produced.

3. Gauge as claimed in claim 1 in which said ion source is connected to a high voltage source through a diode.

4. Gauge as claimed in claim 1 in which said means for producing a corona discharge of ions comprises a conductive wire parallel to the direction of flow of the gas.

5. Gauge as claimed in claim 4 in which said collecting electrodes comprise cylinders coaxial with said wire.

6. Gauge as claimed in claim 4 in which said collecting electrodes consist of a resistive conductive wire helically wound about said ion-discharging wire.

7. Gauge as claimed in claim 4 in which said ion-discharging wire extends axially of said gauge and comprising a supplemental polarized electrode consisting of two axially spaced substantially identical cylinders inside said collecting electrodes, said cylinders being connected to means for maintaining them at the same potential.

8. Gauge as claimed in claim 5 which comprises an electrostatic screen in the immediate proximity of said collecting electrodes.

9. Gauge as claimed in claim 5 in which said collecting electrodes are cylinders the adjacent ends of which are provided with saw teeth, the teeth on one electrode being opposite the spaces between the teeth of the other electrode.

10. Gauge as claimed in claim 4 in which the conductive wire which constitutes the ion source is stretched between two conductive mandrels and the ends of said mandrels in contact with said wire are shaped to improve the linearity of response of the gauge.

11. Method of measuring the mass flow of a gas independently of the nature and purity of the gas, which method comprises the steps of
    producing a corona discharge to provide a uniformly distributed flux of ions travelling in an electrical field having equipotential surfaces substantially parallel to the direction of gas flow;
    measuring the difference in the currents produced on two distinct collecting electrodes beginning as soon as possible after the most rapidly moving ions have reached the collecting electrodes and at the latest at the moment at which the slowest ions have reached the collecting electrodes;
    and correcting the resulting measurement by a coefficient inversely proportional to time so that the final measurement is independent of the mobility of the ions.

* * * * *